(12) United States Patent
Mäkipää

(10) Patent No.: US 7,277,398 B1
(45) Date of Patent: Oct. 2, 2007

(54) METHOD AND TERMINAL FOR PROVIDING SERVICES IN TELECOMMUNICATION NETWORK

(75) Inventor: Risto Mäkipää, Otava (FI)

(73) Assignee: Domiras Oy (FI)

( * ) Notice: Subject to any disclaimer, the term of this patent is extended or adjusted under 35 U.S.C. 154(b) by 0 days.

(21) Appl. No.: 09/462,761

(22) PCT Filed: Jul. 15, 1998

(86) PCT No.: PCT/FI98/00598

§ 371 (c)(1),
(2), (4) Date: Jan. 12, 2000

(87) PCT Pub. No.: WO99/07152

PCT Pub. Date: Feb. 11, 1999

(30) Foreign Application Priority Data

Jul. 17, 1997 (FI) .................. 973033

(51) Int. Cl.
*H04L 12/26* (2006.01)
*H04J 3/26* (2006.01)
*G06F 3/00* (2006.01)

(52) U.S. Cl. .................. 370/252; 370/432; 725/39

(58) Field of Classification Search ......... 370/263, 370/264, 270, 493, 532, 230, 235, 252, 394, 370/432, 468, 473, 537; 705/48, 54, 59; 709/37–61
See application file for complete search history.

(56) References Cited

U.S. PATENT DOCUMENTS

| | | | |
|---|---|---|---|
| 5,359,601 A * | 10/1994 | Wasilewski et al. | 370/486 |
| 5,404,393 A | 4/1995 | Remillard | |
| 5,524,141 A | 6/1996 | Braun et al. | |
| 5,583,864 A | 12/1996 | Lightfoot et al. | |
| 5,630,119 A | 5/1997 | Aristides et al. | |
| 5,844,620 A * | 12/1998 | Coleman et al. | 725/54 |
| 5,867,207 A * | 2/1999 | Chaney et al. | 725/54 |
| 5,937,331 A * | 8/1999 | Kalluri et al. | 725/146 |
| 6,005,562 A * | 12/1999 | Shiga et al. | 715/721 |
| 6,147,714 A * | 11/2000 | Terasawa et al. | 348/564 |
| 6,173,330 B1 * | 1/2001 | Guo et al. | 709/232 |
| 6,215,530 B1 * | 4/2001 | Wasilewski | 348/731 |
| 6,493,876 B1 * | 12/2002 | DeFreese et al. | 725/100 |

(Continued)

FOREIGN PATENT DOCUMENTS

EP      0 718 786      6/1996

(Continued)

OTHER PUBLICATIONS

Digital Video Broadcasting (DVB) Standard, European Telecommunications Standards Institute (Oct. 1996).

*Primary Examiner*—Wing Chan
*Assistant Examiner*—Hong Sol Cho
(74) *Attorney, Agent, or Firm*—McDonnell Boehnen Hulbert & Berghoff LLP

(57) ABSTRACT

A method and a terminal for providing services in a telecommunication network wherein the selection data of a service is formed by using the identification and control date of the services located in the multiplexed frames used for transmitting the services. The terminal is designed to display the selection data of the service, which data is formed from the identification and control date of the multiplexed frames for transmitting the service.

23 Claims, 2 Drawing Sheets

U.S. PATENT DOCUMENTS 6,516,467 B1 * 2/2003 Schindler et al. ........... 725/153
6,522,342 B1 * 2/2003 Gagnon et al. ............. 715/716
6,732,370 B1 * 5/2004 Gordon et al. ................ 725/39

FOREIGN PATENT DOCUMENTS

| EP | 0 752 787 | 1/1997 |
| EP | 0 756 423 | 1/1997 |
| WO | WO 95/15658 | 6/1995 |
| WO | WO 96/17476 | 6/1996 |
| WO | WO 96/34486 | 10/1996 |
| WO | WO 97/06639 | 2/1997 |

* cited by examiner

METHOD AND TERMINAL FOR PROVIDING SERVICES IN TELECOMMUNICATION NETWORK

BACKGROUND OF THE INVENTION (1) Field of the Invention

The invention relates to a method for providing a customer with services which can be transmitted in a multiplexed form via a terminal connected to a network, in which method different selection data regarding available services is presented to the customer for selecting a service.

The invention further relates to a terminal in a telecommunication network, such as a television or a computer, which is arranged to receive a service transmitted in a multiplexed form and which is arranged to present separate selection data regarding the services of a service provider to the user for selecting a service.

(2) Description of Related Art

An increasing number of different services, which the customers then search and order by means of different programs for browsing and searching, will be transmitted in the Internet and other different network and data transfer systems in the future. Radio and television programs, videos and various other services in audiovisual or text form are, for example, services of this type. In the present patent application and claims, a telecommunication network means all such networks, for example, data networks, cable channel networks, broadcast and satellite networks and other networks in which data can be transmitted at least in one direction.

BRIEF SUMMARY OF THE INVENTION

In the present systems for providing services the customer browses suitable topics by a search program and subsequently always performs a transfer from a server to another by a selector, searching for a single file or a service. Various search programs in which certain desired items can be stored and the system checks, for example, whether a service has changed and automatically delivers a new, changed service to the customer are entering the market. The operation of this kind of browsers is, however, always based on processing one item, such as a file, at a time and, in most cases, the file in question has to be stored on the customer's hard disk before sufficient information can be obtained from it. Different programs can, in turn, be typically supplied to a network as a multiplexed code in which the data of several programs is transmitted in a frame comprising, at the beginning of the frame, data regarding the type of the different programs, the location and the length of the data and the address at which the data in question can be found. Correspondingly, the transmission of different data from a server to another in different networks can be performed using multiplexing. Similarly, in connection with radio, television or other such services one multiplexed channel can be selected, and even though the channel comprises several services, only the services defined by one multiplexed frame can be selected. Here again, a transfer from an item to another must always be performed until the multiplexed service in question is found, and not until then is it possible to check what services are available at the item in question.

Various methods and devices for ordering and delivering services have been developed for different purposes, and methods and devices of this kind are disclosed for example in EP 0718786, WO 96/17476, WO 97/06639, U.S. Pat. No. 5,404,393, U.S. Pat. No. 5,524,141 and U.S. Pat. No. 5,583,864. In all these publications prior art with the above disadvantages and drawbacks has been applied.

An object of the present invention is to provide a rapid method which is easy to use and equipment by which different services provided in different networks can be arranged in a simple menu available for the user so that the user can select the desired service without several sequential searches and browsings.

The method of the invention is characterized in that the selection data for the selection of the service is formed by using the identification and control data of the services located in the multiplexed frames used for service transmission.

Furthermore, the terminal of the invention is characterized in that the terminal is arranged to display the selection data of the service formed from the identification and control data which is located in the multiplexed program frames used for service transmission.

The invention is based on the idea that services provided via the Internet or some other appropriate network or transmission system are delivered as a multiplexed frame, whereby each frame comprises the identification and control data of the services associated with it, data regarding the services and optionally a service provider address and, in addition, optionally data regarding the necessary hardware configurations by means of which the service can be delivered. The essential idea of the invention is that the identification and control part located at the beginning of the frame and comprising data regarding the location and size of the program in the frame, the provider address and optionally specification data regarding the necessary equipment and service identification data is separated from the multiplexed frame of each desired service, and that this identification and control data of the frames is used to form the selection data of the service to be displayed to the user. The most preferably this data is compiled to form a file for providing services, which is stored in the server of the network and/or provided as a broadcast-type data-service in such a manner that the data on the services being provided is automatically transmitted to the equipment connected to the network for browsing, and when the customer has selected the desired service from the service list displayed on the screen of his/her terminal, the service is automatically delivered to the customer in accordance with the addresses and any equipment specifications obtained from the identification and control data via, for example, network servers or by connecting the customer to a broadcast-type service, for example. Independently of the route of the service, the distribution network used and the location of the service provider, the user can thus browse through the service list on his/her screen purely as a list of service titles, for example, without having to know in what form, from where, via what route and by what kind of equipment the service can be delivered. When the customer selects a service, for example, on a conventional television screen via a reception memory concerning the service data connected to it, he/she can select the service either by a television remote control or by a keyboard or the like of user interface equipment, such as a PC. Similarly, a service can be ordered, for example, by using a scanning controller by which the service identification can be scanned in from a printed booklet or a program catalogue and the scanned data can be used for selecting or ordering the service via the system. Next, a PC or some other appropriate terminal delivers the service order in accordance with the information in the service control and identification data, and the service is automatically activated. If the control data also comprises a hardware configuration specification and the above PC, for example, or the receiver must comprise certain units or components for receiving the service and if, for example, there is no unit necessary for the decoding available, the data can be decoded at an appropriate server and subsequently delivered in conventional data form to the PC and forwarded to the screen or the television. The selection can also be implemented in such a manner that the program selection data is available for the selection in one terminal by means of which the selection can be made, but the control data is located in the other terminal so that the service can be delivered to the customer after the selection has been made. A program menu, in other words the program selection data can thus be delivered, for example, via the television to the program selection while the PC, after the selection has been made, makes the service accessible to the customer.

An advantage of the present invention is that the customer is not compelled to search and browse through information from one server to another in order to find or obtain the services he/she is looking for. A further advantage of the invention is that the customer can choose between different services in different types of networks from the same terminal without needing to study different search or other routines and protocols. Furthermore, multiplexing makes it possible to receive several services simultaneously, for example file transfer and program monitoring, etc. A further advantage of the invention is that different services need not be delivered via a network/networks until the selection has been made, whereby the unnecessary load caused by the searches and service transmissions in the networks decreases and the network's capacity to efficiently transmit the desired services increases.

BRIEF DESCRIPTION OF THE SEVERAL VIEWS OF THE DRAWINGS

The invention is described in closer detail in the accompanying drawings, in which.

DETAILED DESCRIPTION OF THE INVENTION

Figure 1:
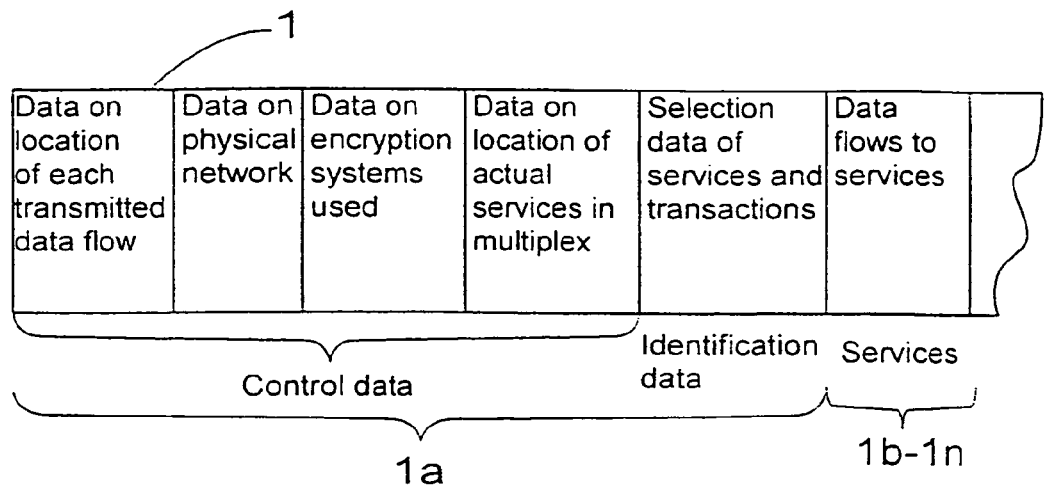
FIG. 1 is a schematic view of a typical multiplexed frame with its services.

FIG. 1 is a schematic view of a conventional multiplexed frame 1 comprising several different services. A program frame comprises several different parts, a first one of which 1a comprises the identification and control data of the services located in the frame 1. This part of the frame indicates which services are multiplexed in the frame and at which point of the frame each service can be found, in other words information regarding the start and the end of the service. The identification and control part, in turn, comprises information regarding the form in which each service is connected with the multiplexed frame and optionally also information regarding the type of necessary reception equipment, in other words the configuration information of the service. The other parts 1b to 1n of the frame 1 comprise actual services in a predefined form.

Multiplexed frames of this kind are typically used when different programs, such as radio, television, video, etc. programs, are delivered in a data form to a network. Several services of this kind for wireless and wired networks are thus presently available from different service providers. As the networks improve and the transfer rates increase, services of this kind will more often be provided on an "on demand" basis, and the selection of the services will thus become even more complicated. With the present method, the increasing supply of services will be easier and simpler to control and the services can be delivered to the customers in quite a simple and easy manner. Hence selection data regarding the services being provided, in other words advantageously a file form service directory comprising the information located in the identification and control part of the frame regarding the services provided particularly by the above frame and other aspects related to them, is formed from the multiplexed frame 1 shown in FIG. 1 by means of the first part comprising the identification and control data. In addition, this file comprises accurate information regarding in what network and often also at what address of the network the service is actually available. The file comprising the service directory can thus be transmitted separately from the actual services being provided to the servers of an appropriate network or, via other computers controlling and processing the network operation, transmitted forward either within the same network or from it to another network and via this other network to the actual user terminal where the services are shown on an integral or separate display unit in an appropriate and easy-to-use form.

When a user connects to a network, for example, the network server can automatically deliver the service directory to the user terminal for viewing. The creation of the service directory can be performed from one frame, for example, or in accordance with the definitions made by the user, from several frames of services either available for the same network or from the frames of several different services in different networks by combining their identification and control data. Instead of the service directory, it is possible to use an application in which instead of the service directory formed from the identification and control data of the frames, the identification and control data is transmitted directly to the user's display unit, which, on the basis of the identification and control data, forms the selection data to be viewed by the user by utilizing, for example, an appropriate decoding program or some other appropriate program. A service directory, which is, however, compiled by the user's display unit or other terminal connected to the network, such as a PC or the like, can thus also be formed.

Figure 2:
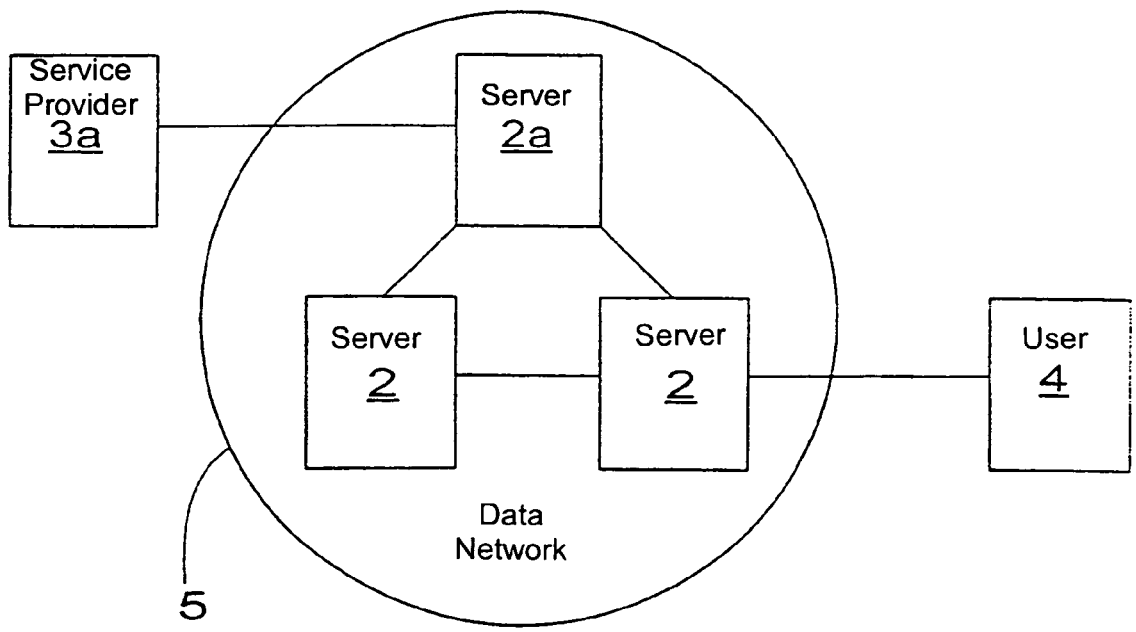
FIG. 2 is a schematic view of the transmission of a service via a network to a customer's display unit.

FIG. 2 is a schematic view of a typical network in which there are servers 2 operating in the network and interconnected in a manner known per se. Different service providers 3a, which provide services in various forms for the network, are, in turn, connected to the servers 2. At least some service providers provide services in a multiplexed form to ensure the transfer of the services in an appropriate manner via the network to potential service users. Users 4 are also connected to the network, and they are connected to the network via the servers 2. The users have a terminal connected to the user interface, by which terminal the service directories of the services available in the network and, similarly, the services found as a result of a search, can be displayed. The terminal can be a PC, a separate display unit, a monitor accompanying a so-called SET-TOP box, a television or the like by which the data can be displayed. Similarly, several different devices can be connected to the user interface, at least one of them having a display unit which operates as a display device, and the selection of a program and a service order can be delivered to a network by other devices.

In accordance with the invention, a file-form service directory is created from the multiplexed services by means of the identification and control data of their frame by, for example, the server 2a to which a service provider 3a providing the multiplexed service in question is connected. The server 2a, in turn, transmits the service directory file to the other servers in the network, for example, whereby the users 4 connected to them receive the service directory on their terminal immediately after connecting to their server. It is also possible to create a service directory in such a manner that the above identification and control data of the multiplexed frames 1 are first transmitted to one server, which then creates a service directory from the data and delivers it as a whole to the other servers in the network.

The multiplexed services delivered in the network originate, for example, from different broadcasting companies or the like, which combine the different services into a finished multiplexed delivery in their program service and transmit it to the distribution network where it can be selected in an ordinary way. In practice, services are delivered in this way via data, satellite, cable and other separate networks. Different service providers can be, and currently usually are, connected to potential customers via the Internet, for example, providing their present services.

In accordance with the present method, the identification and control data obtained from the frames of one or more different service providers are combined into selection data, such as files, for example, comprising the service directory of available services. The service directory is delivered in file form via, for example, the Internet or other data networks to the servers in the network, via which servers the customers are connected to the network by their personal display units. When the customer connects to the network, the network server transmits a service directory to the user terminal, typically a PC, so that the customer can select a service from it. The contents of the service directory can be either compiled from the products of certain program providers or adapted for a particular customer from a more extensive range of particular type of services in accordance with the search conditions defined by the customer. Also, the service directory can be modified on the basis of the identification and control data in such a manner, for example, that only the services of the directory which can be delivered via the customer's equipment are displayed. Furthermore, if the customer's terminal or other equipment associated with it lacks a necessary unit, it is also possible for a server equipped with a corresponding unit to convert the delivered service into a form in which it can be delivered to the customer in data form at least in some way via the user terminal or the accompanying peripherals, such as separate display units.

When in file-form, the service directory comprises data regarding the available services. Furthermore, it also comprises access data of each service, in other words data regarding the address of the service provider or the other addresses where the service in question can be found. Similarly, it can comprise data, for example, on the hardware configuration required by each service, whereby after the user has connected to the server the configuration and hardware data of the user are available and the prerequisites for delivering services can thus be checked. Also, the most suitable type of delivery to the customer in question can also be checked.

When the customer selects a particular service, the network server transmits a delivery order to the address of the service provider in question, whereby the necessary configuration and other data are delivered simultaneously. The service is thus connected efficiently, with no need at all for the customer to know the origin of the service arriving at the customer's terminal or other display unit, such as a television.

Figure 3:
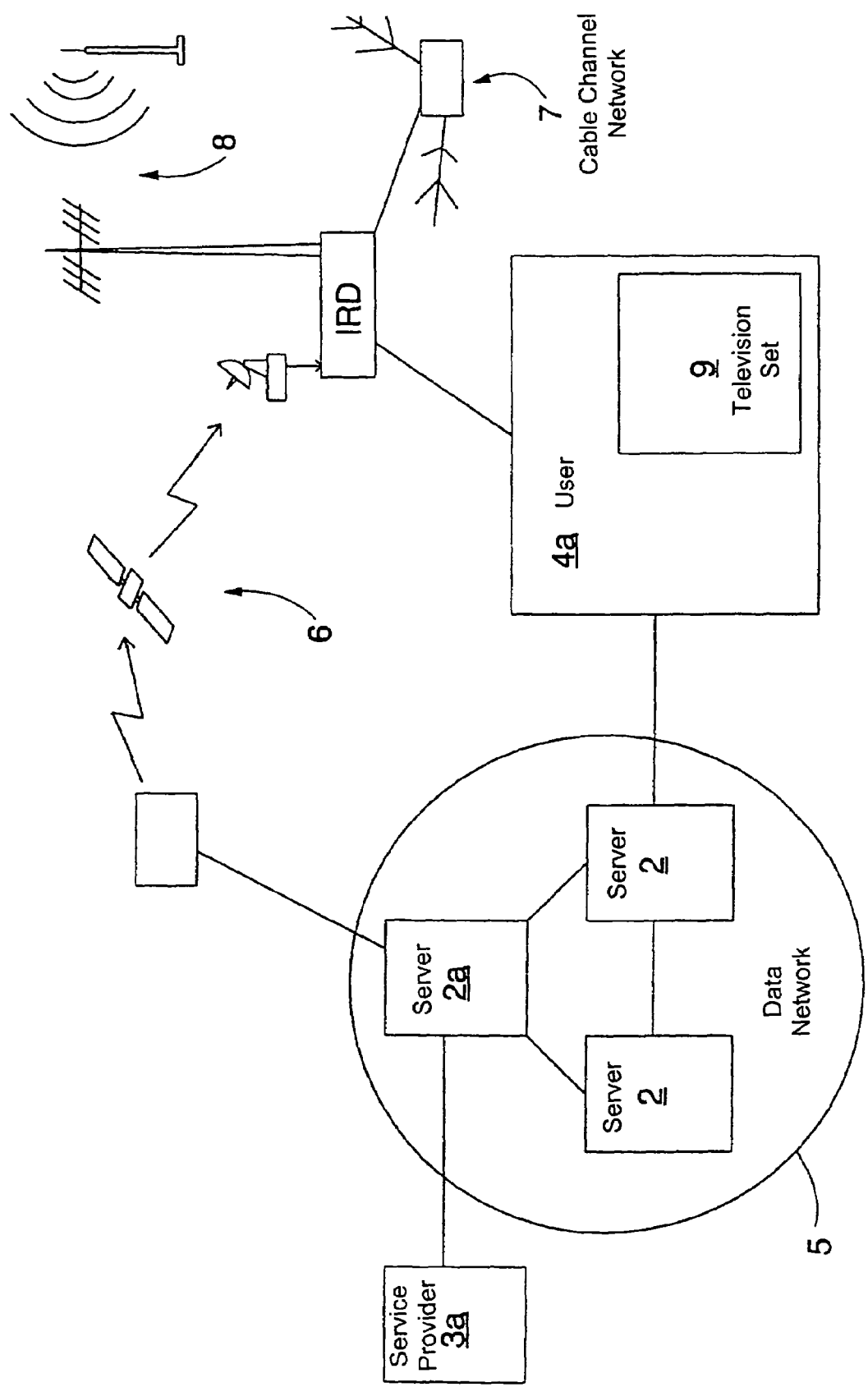
FIG. 3 is a schematic view showing how a service order is transmitted to a service provider and a service to the customer via an appropriate network.

FIG. 3 shows a schematic view of a network consisting of several networks; in addition to a data network 5, there is a satellite antenna network 6, a cable channel network 7 and a broadcasting network 8 in use. All these networks are interconnected in such a manner that the services to be delivered in a multiplexed form in each network can be combined, if desired, by utilizing the identification and control data of their multiplexed frames. The services provided, combined in a desired way, are delivered as a service directory to a user 4a, who, in accordance with the above description, selects the desired service. A service provider 3a, in turn, is notified of this, whereby, depending on the quality of the service and the network alternatives available for the user, the service in question can be delivered to the customer in as high-quality form as possible. A video film, for example, can thus be delivered, for example, via the cable channel network 7 used by the subscriber straight to his/her television set 9 with no need to transmit it via the data network 5. Correspondingly, the service is being ordered and if chargeable services are in question, the customer's contact and billing information are transmitted to the service provider straight via the data network.

The invention has been described in the specification and the drawings only by way of example, and it is by no means restricted thereto. A service, for example, can be provided by connecting a service to a service page or some other service as an icon, utilizing said identification and control data which have been delivered separately from the actual service, whereby the user can view the service by clicking the icon. Further, the identification and control data or the service directory can be delivered not only via the Internet but also via other networks to an appropriate terminal, if it is possible to transmit data in both directions so as to notify the provider of the selection and to deliver the service to the customer.

The invention claimed is:

1. A method for providing a customer with service information via a terminal connected to a telecommunication network, the method comprising:
   multiplexing a plurality of service data in a frame format to form a service multiplex for service transmission, whereby identification and control data of the service data are located in at least one part of the multiplexed frames to be transmitted with the respective service data;
   forming selection data for the selection of the service data on the basis of the identification and control data located in the service multiplex;
   transmitting the selection data separately, without the actual service data of the service multiplex, to the customer terminal for displaying the selection data; and
   in response to the user selecting a service displayed on a display unit, identifying the selected service on the basis of said identification and control data associated with the selected service and transmitted in multiplexed frames, and providing the customer with the identified service from the service multiplex.

2. A method as claimed in claim 1, further comprising transmitting the selection data to the customer terminal via a different network than the service multiplex is transmitted.

3. A method as claimed in claim 1, further comprising creating a service directory from said identification and control data, which service directory comprises the selection data and by which the services are presented on a display unit.

4. A method as claimed in claim 3, further comprising compiling a separate service directory on the basis of said identification and control data; and transmitting said service directory to the display unit in response to said display unit connecting to a telecommunication network.

5. A method as claimed in claim 4, further comprising compiling said service directory from the identification and control data of several multiplexed frames comprising a plurality of services.

6. A method as claimed in claim 3, further comprising compiling said service directory from the identification and control data of several multiplexed frames comprising a plurality of services.

7. A method as claimed in claim 3 or 4 or 6 or 5, further comprising updating said service directory continuously to servers operating in the telecommunication network in accordance with the predetermined multiplexed services; and transmitting said service directory to the display unit in response to said display unit establishing a connection to said telecommunication network.

8. A method as claimed in claim 1, further comprising in response to the user selecting a service displayed on the display unit, determining the telecommunication network, which is the most suitable for deliver the service; and delivering the service selected by the user from the transmitting address to the receiver via said determined telecommunication network.

9. A method as claimed in claim 1, further comprising routing the selected service from the transmitting address to the receiver automatically on the basis of said identification and control data of the multiplexed frame.

10. A method according to claim 1, further comprising forming automatically the selectin data for selection of the service on the basis of the identification and control data located in the service multiplex.

11. A method according to claim 1, further comprising presenting the services on the display unit in a form of a icon.

12. A method according to claim 1, wherein said selection data comprises a selection data file.

13. A method of using a terminal of a telecommunication network, which is arranged to receive selection data regarding a plurality of service data of a service provider comprising the steps of:
  selecting a service to be transmitted to said terminal in a multiplexed form;
  displaying the selection data of the service, which selection data is formed from the identification and control data located in the multiplexed service data frames to be transmitted with the respective service data, and which selection data has been transmitted separately, without the actual service data of the service multiplex; and
  identifying, in response to the user selecting a service displayed on a display unit, the selected service on the basis of said identification and control data associated with the selected service and transmitted in multiplexed frames, and providing the customer with the identified service from the service multiplex.

14. The method as claimed in claim 13, wherein the terminal is arranged to receive the selection data via a different network than the service multiplex is transmitted.

15. The method as claimed in claim 13, wherein for forming the selection data of the service, the terminal is arranged to receive the service directory comprising the selection data and formed from the identification and control data.

16. The method as claimed in claim 13, wherein the terminal is a television or a computer.

17. A terminal according to claim 13, wherein said selection data comprises a selection data file.

18. A system for providing a customer with service via a terminal connected to a telecommunication network, comprising
  a multiplexer multiplexing a plurality of service data in a frame format to form a service multiplex for service transmission, whereby identification and control data of the service data are located in at least one part of the multiplexed frames to be transmitted at the same time with the respective service data;
  a data generator automatically generating a combined service selection data for enabling a selection of said plurality of services available in the multiplex, said combined service selection data being automatically derived from the identification and control data of the service multiplex; and
  transmitter transmitting the combined service selection data, independently from the transmission of the corresponding service data and the associated identification and control data in the multiplexed frames, to a customer terminal to be displayed in form of a combined service section list of said plurality of services available in the multiplex, whereby the customer terminal, in response to the user selecting a service on said combined service selection list, automatically identifies and provides to the customer the selected services using service data from those subsequently received multiplexed frames which contain identification and control data matching to the service selection data associated with the selected service.

19. A system according to claim 18, wherein said selection data comprises a selection data file.

20. A method for providing a customer with service via a terminal connected to a telecommunication network, the method comprising
  multiplexing a plurality of service data in a frame format to form a service multiplex for service transmission, whereby identification and control data of the service data are located in at least one part of the multiplexed frames to be transmitted at the same time with the respective service data;
  automatically generating a combined service selection data file for enabling a selection of the plurality of services available in the multiplex, said combined service selection date file being automatically derived from the identification and control data of the service multiplex; and
  transmitting the combined service selection data file, independently from the transmission of the corresponding service data and the associated identification and control data in the multiplexed frames, to a customer terminal to be displayed in the form of a combined service selection list of said plurality of services available in the multiplex, whereby the customer terminal, in response to the user selecting a service on said combined service selection list, automatically identifies and provides to the customer the selected service using service data from those subsequently received multiplex frames which contain identification and control data matching the service selection data associated with the selected service.

21. A method for providing a customer with service via a terminal connected to a network, the method comprising multiplexing a plurality of service data in a frame format to form a service multiplex for service transmission, whereby identification and control data of the service data are located in at least one part of the multiplexed frames to be transmitted at the same time with the respective service data over a broadcast network to said terminal;

generating a service selection data file for the selection of the service data from the basis of the identification and control data located in the service multiplex;

transmitting the service selection data file separately through a data network, independently from transmission of the actual service data of the service multiplex and the associated identification and control data in the multiplexed frames in said broadcast network, to the customer terminal for displaying the service selection data file;

transmitting the service data and the identification and control data of the service data in multiplexed frames to the customer terminal over said broadcast network; and in response to the user selecting a service displayed on a display unit, providing the customer with the selected service from those multiplexed frames subsequently received over said broadcast network and containing identification and control data matching to the selected service's services selection data file obtained through said data network.

22. A method according to claim 21, wherein said service selection data file is transmitted via a server in said data network.

23. A method for providing a customer with service via a terminal connected to a telecommunication network, the method comprising:

multiplexing a plurality of service data in a frame format to form a service multiplex for service transmission, whereby identification and control data of the service data are located in at least one part of the multiplexed frames to be transmitted with the respective service data;

forming selection data file for the selection of the service data on the basis of the identification and control data located in the service multiplex; and transmitting the selection data file separately, without the actual service data of the service multiplex, to the customer terminal for displaying the selection data file.

* * * * *